United States Patent
Kim

(10) Patent No.: US 9,193,250 B2
(45) Date of Patent: Nov. 24, 2015

(54) ENGINE MOUNTING STRUCTURE FOR REDUCING VIBRATION

(71) Applicant: Hyundai Motor Company, Seoul (KR)

(72) Inventor: Yong Joo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 140 days.

(21) Appl. No.: 13/847,203

(22) Filed: Mar. 19, 2013

(65) Prior Publication Data

US 2014/0175257 A1    Jun. 26, 2014

(30) Foreign Application Priority Data

Dec. 26, 2012  (KR) .................... 10-2012-0153498

(51) Int. Cl.
*F16M 1/00*  (2006.01)
*B60K 5/12*  (2006.01)

(52) U.S. Cl.
CPC ............ *B60K 5/1266* (2013.01); *B60K 5/1216* (2013.01); *B60K 5/1225* (2013.01); *B60K 5/1241* (2013.01)

(58) Field of Classification Search
CPC .. B60K 5/1266; B60K 5/1216; B60K 5/1241; B60K 5/1225
USPC .............. 248/672, 638; 310/91; 180/232, 300
See application file for complete search history.

(56) References Cited

U.S. PATENT DOCUMENTS

| 3,868,833 | A | * | 3/1975 | Noe et al. ..................... 464/71 |
| 4,941,544 | A | | 7/1990 | Fischle et al. |
| 8,079,576 | B2 | | 12/2011 | Kim |
| 8,839,899 | B2 | * | 9/2014 | Kim et al. ..................... 180/300 |
| 2012/0272933 | A1 | * | 11/2012 | Naritomi et al. ........... 123/192.1 |

FOREIGN PATENT DOCUMENTS

| DE | 10245376 A1 | 5/2003 |
| JP | 7071534 A | 3/1995 |
| JP | 2004332662 A | 11/2004 |
| JP | 2006175894 A | 7/2006 |
| JP | 2010043625 A | 2/2010 |
| JP | 2010285020 A | 12/2010 |
| JP | 2011080492 A | 4/2011 |
| KR | 10-0921810 B1 | 10/2009 |

* cited by examiner

*Primary Examiner* — Gwendolyn Baxter
(74) *Attorney, Agent, or Firm* — Mintz Levin Cohn Ferris Glovsky and Popeo, P.C.; Peter F. Corless

(57) ABSTRACT

Disclosed herein is an engine mounting structure for reducing vibration. In particular, an engine having a mass is mounted to a damper pulley or a drive plate thereof to form an outer balancer. A roll mount is positioned on a virtual yaw axis after the virtual yaw axis is set in the engine, and an engine mount is mounted to one end of a virtual torque roll axis after the virtual torque roll axis is set in the engine. Furthermore, a transmission mount is mounted to the other end of the virtual torque roll axis. Therefore, the mounts are mounted to the engine to reduce vibration at the time of idle vibration, thereby making it possible to improve NHV performance of a vehicle and increase salability and driving convenience of a driver.

5 Claims, 7 Drawing Sheets

ENGINE MOUNTING STRUCTURE FOR REDUCING VIBRATION

CROSS-REFERENCE TO RELATED APPLICATION

This application is based on and claims priority from Korean Patent Application No. 10-2012-0153498, filed on Dec. 26, 2012 in the Korean Intellectual Property Office, the disclosure of which is incorporated herein in its entirety by reference.

BACKGROUND OF THE INVENTION

1. Field of the Invention

The present invention relates to an engine mounting structure for reducing vibration, and more particularly, to an engine mounting structure for reducing vibration during idle vibrations via the engine mounts.

2. Description of the Prior Art

With an increase in a demand for compact vehicles, the size of an engine has become smaller and as such vehicles in which a 3-cylinder engine is mounted therein have become increasingly popular. However, currently, 3-cylinder engines have some drawbacks compared to a typical 4-cylinder engine due to the amount of vibration they produce. In connection with this, the greatest weakness in view of noise vibration harness (NVH) of the 3-cylinder engine is idle vibration, which is caused by exciting force by pitch and yaw moments corresponding to vibration components of the engine as shown in FIGS. 1A and 1B.

Generally, in most of the 3-cylinder engines, since the pitch and yaw moments are coupled to each other by 50%, an engine mount needs to be designed differently to cope with the above-mentioned additional exciting force in addition to a roll moment, which is an existing main vibration component.

Although some engine mounts for reducing vibration and noise generated by the engine have been developed, a significant amount of vibration is still generated in yaw and roll moments at the time of idle vibration to deteriorate NVH performance of the vehicle, such that salability and driving performance of the vehicle is also deteriorated as a result of the vehicles lack-luster NVH performance.

SUMMARY OF THE INVENTION

Accordingly, the present invention has been made to solve the above-mentioned problems occurring in the prior art while advantages achieved by the prior art are maintained intact. Advantageously, the exemplary embodiment of the present invention provides an engine mounting structure that reduces vibration during idling via engine mounts that are supporting the engine.

In one aspect of the present invention, there is provided an engine mounting structure for reducing vibration that includes an engine having a mass mounted at a damper pulley or a drive plate thereof to form an outer balancer; a roll mount positioned on a virtual yaw axis after the virtual yaw axis is set in the engine; an engine mount mounted at one end of a virtual torque roll axis after the virtual torque roll axis is set in the engine; and a transmission mount mounted at the other end of the virtual torque roll axis.

More specifically, the entire excitation of the engine may be generated along the virtual yaw axis through the mass. Additionally, the roll mount may be a roll rod type mount reducing horizontal rigidity, and the engine mount and the transmission mount may be damping mounts in a front and rear direction for reducing a spring value at an idle frequency. Furthermore, orifice plates in the front and rear direction may be formed in the engine mount and the transmission mount to enable damping in the front and rear direction.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Exemplary embodiments of the present invention will be described in detail with reference to the accompanying drawings.

An engine mounting structure configured to reduce vibration according to an exemplary embodiment of the present invention is configured to include an engine 100, a roll mount 110 positioned at a yaw axis of the engine 100, an engine mount 120 mounted at one end of a torque roll axis of the engine 100, and a transmission mount 130 mounted at the other end of the torque roll axis of the engine 100, as shown in FIGS. 2 to 7.

Figure 1A:
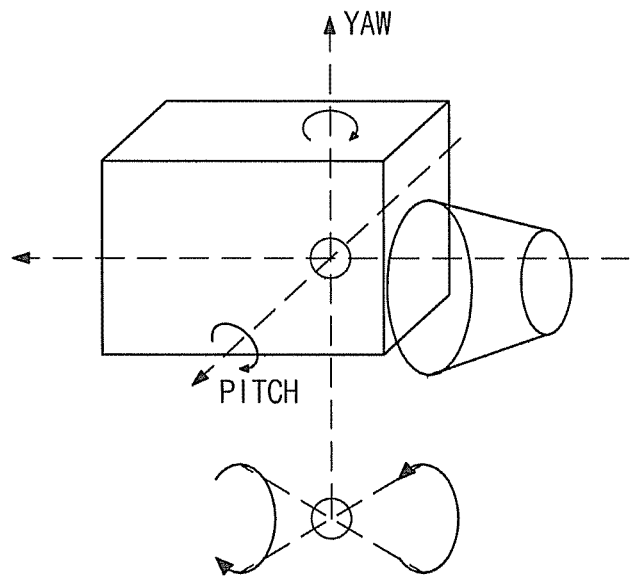
FIGS. 1A-1B are views showing vibration components generally generated in an engine.
Figure 1B:
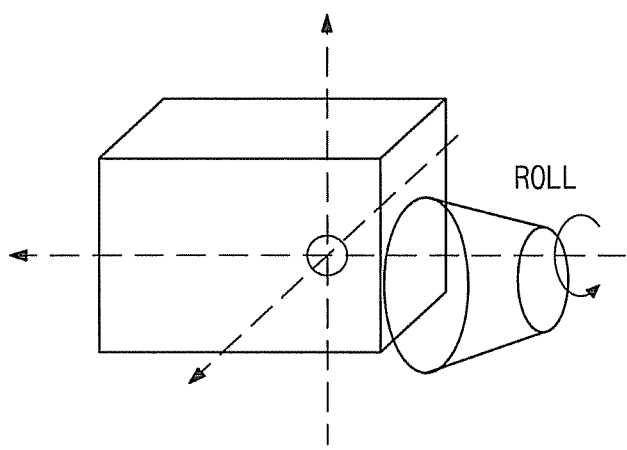
Figure 3:
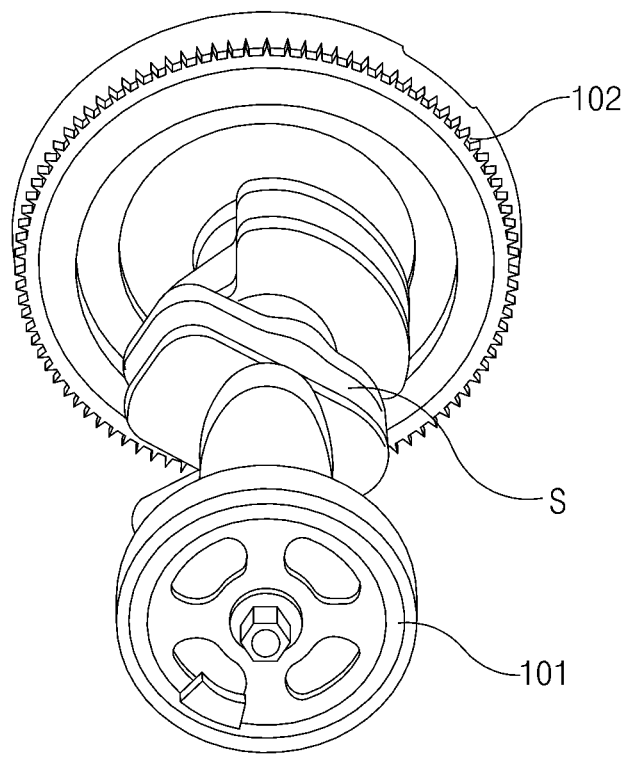
FIG. 3 is a view showing a damper pulley and a drive plate in which a mass is mounted in the engine mounting structure for reducing vibration according to the exemplary embodiment of the present invention.

First, the present invention, which is to improve idle vibration of a 3-cylinder engine, is basically applied to the 3-cylinder engine. Excitation in the 3-cylinder engine is occupied by pitch and yaw moments having a ratio of 50%:50% as described in FIGS. 1A and 1B However, in the exemplary embodiment of the present invention, as shown in FIG. 3, a mass is mounted to a damper pulley 101 or a drive plate 102 of the engine 100 to form an outer balancer, so that excitation divided based on a crank shaft S may be converted into the yaw moment of 100%. As described above, the yaw moment is a virtual yaw axis formed by the engine 100.

Figure 2:
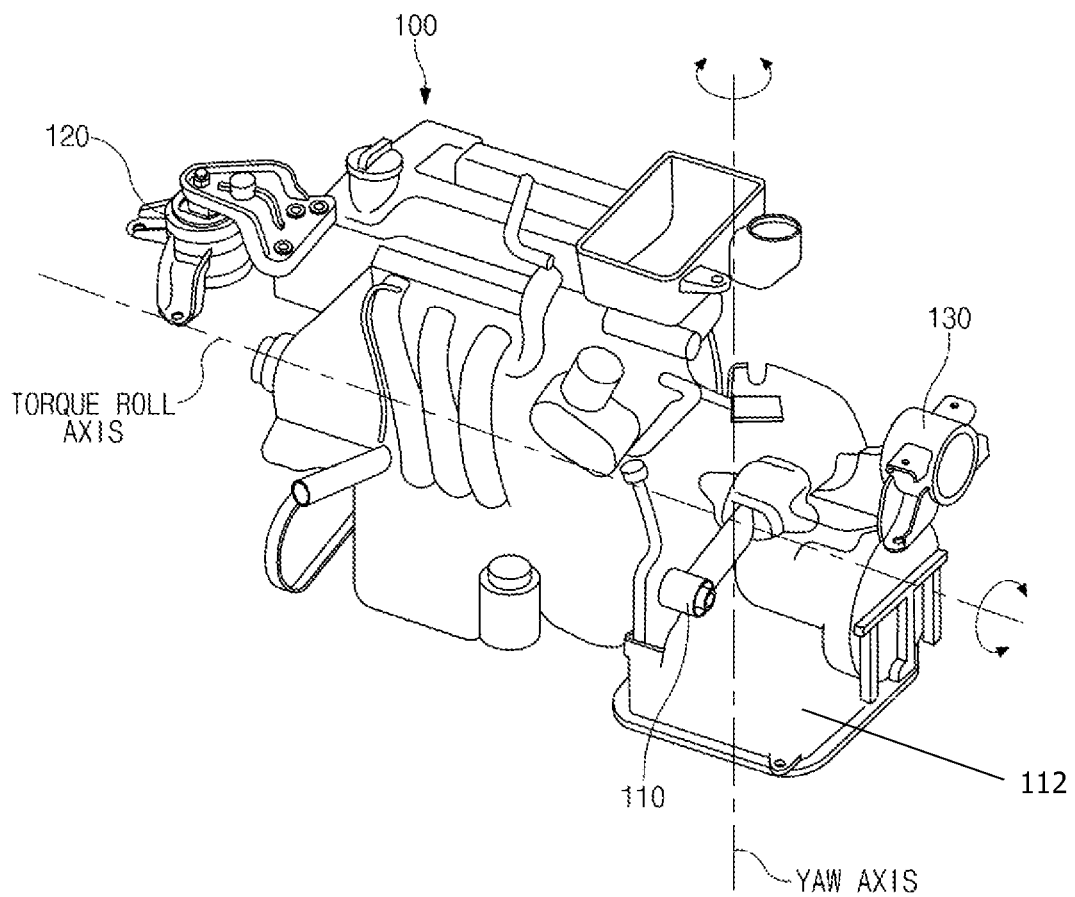
FIG. 2 is a view showing an engine mounting structure for reducing vibration according to an exemplary embodiment of the present invention.

As shown in FIG. 2, the roll mount 110 is positioned on a yaw axis formed in the engine 100 to reduce horizontal excitation by the yaw moment. As stated above, previous mounts have been installed at upper and lower ends of the yaw axis in order to offset the yaw moment. However, since it is difficult to dispose the mount at an upper end of an engine room package, in the exemplary embodiment of the present invention, a support scheme in which one point of an upper portion is removed and the roll mount 110 is positioned at a lower end of a transmission 112, which is part of a power train, may be maintained. Furthermore, in the exemplary embodiment of the present invention, the roll mount 110 is preferably positioned on the yaw if possible. In the case in which the roll mount 110 is spaced apart from the yaw axis in the frontward and rearward direction, since horizontal excitation by the yaw moment is generated, horizontal rigidity is preferably lowered according to a spaced amount. To this end, it is preferable that a roll rod type mount is used as the roll mount 110 of the engine 100 to reduce the horizontal rigidity.

Figure 4:
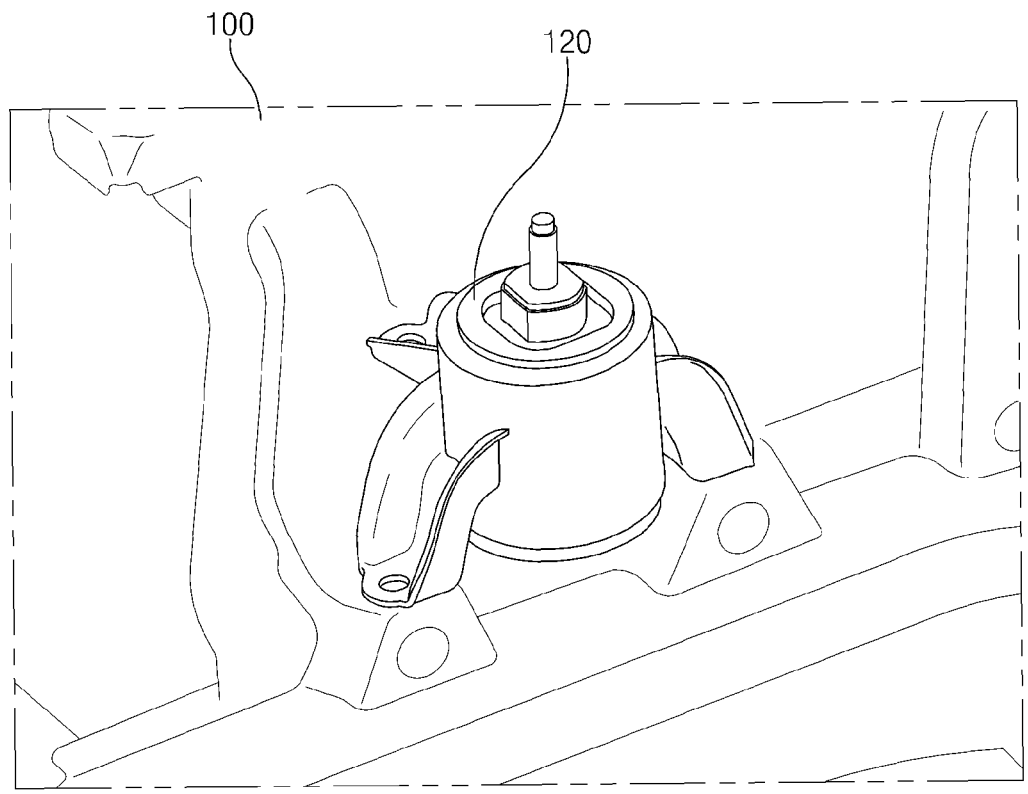
FIG. 4 is a view showing an engine mount mounted at an engine in the engine mounting structure for reducing vibration according to the exemplary embodiment of the present invention.
Figure 5:
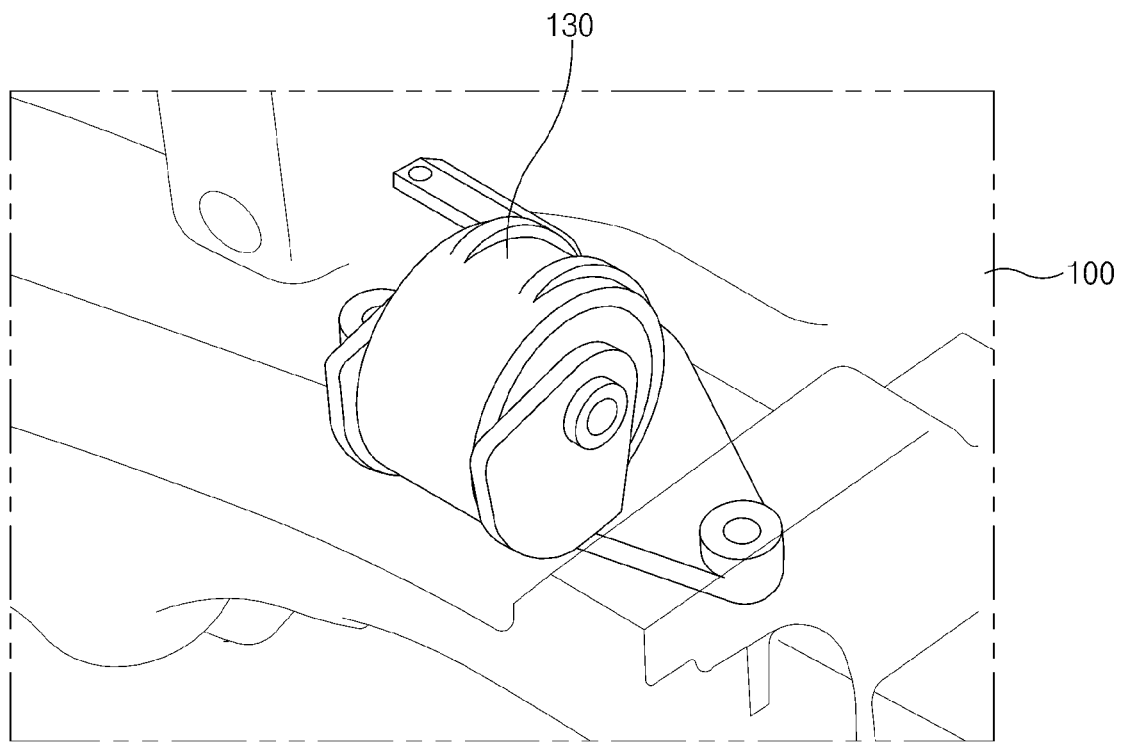
FIG. 5 is a view showing a transmission mount mounted at an engine in the engine mounting structure for reducing vibration according to the exemplary embodiment of the present invention.

Meanwhile, in order to reduce the idle vibration, spring values of the engine mount 120 and the transmission mount 130 in a front and rear direction should be reduced. However, upon receiving a shock while driving or controlling large displacement, the softer the spring value, the more disadvantageous. Therefore, as shown in FIGS. 4 and 5, in the exemplary embodiment of the present invention, the engine mount 120 and the transmission mount 130 that reduces the spring value only during an idle frequency are mounted at both ends of the engine 100.

Here, the engine mount 120 is mounted at one end of a virtual torque roll axis after the virtual torque roll axis is set in the engine 100, thereby making it possible to reduce vibration of the engine 100 in the front and rear direction, and the transmission mount 130 is mounted at the other end of the torque roll axis, thereby making it possible to improve a vibration reducing effect together with the engine mount 120.

Figure 6:
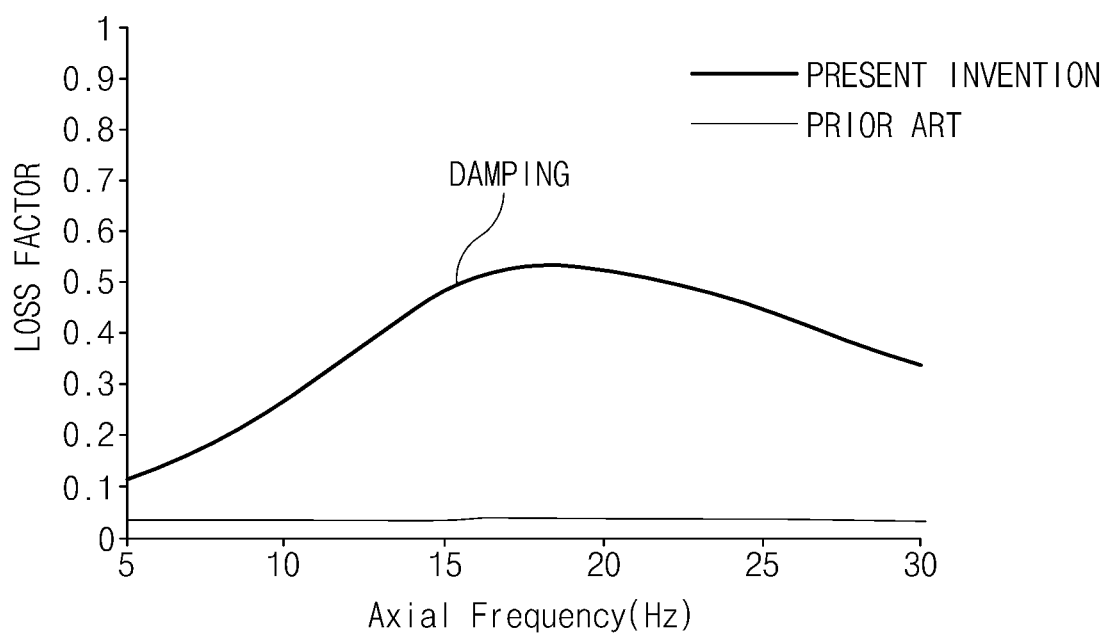
FIGS. 6 and 7 are graphs showing a spring value reducing effect at the time of generation of vibration in the engine mounting structure for reducing vibration according to the exemplary embodiment of the present invention.
Figure 7:
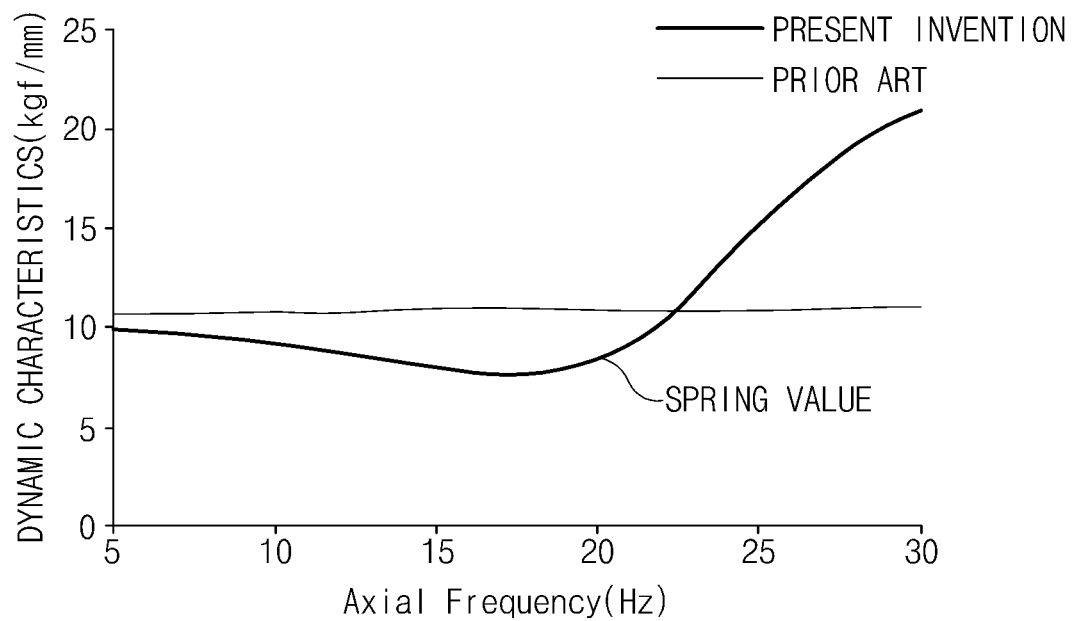

Here, it is preferable that a damping mount in the front and rear direction for reducing the spring value at the idle frequency is used as the engine mount 120 and the transmission mount 130. To this end, orifice plates in the front and rear direction are formed in the engine mount 120 and the transmission mount 130 to enable damping in the front and rear direction. As a result, in the engine mounting structure for reducing vibration according to the exemplary embodiment of the present invention, in order to improve a vibration reducing effect in comparison to those previously mounts discussed above, the roll mount 110 is mounted on the yaw axis of the engine 100, and the engine mount 120 and the transmission mount 130 are mounted at both ends of the torque roll axis. Therefore, the damping mount in the front and rear direction are mounted, such that vibration damping characteristics are improved as compared with a mount in one direction in comparison to previous mounts during large vibrations as shown in FIG. 6 and a dynamic stiffness of a specific frequency band (15 to 20 Hz in FIG. 7) is reduced during small vibration as shown in FIG. 7 to reduce noise vibration harness (NVH) of the vehicle through a damping effect for excitation of the engine mounting in the front and rear direction, thereby making it possible to increase salability and driving performance.

As set forth above, according to the exemplary embodiment of the present invention, engine is supported by the mounts to reduce vibration during idling, thereby making it possible to improve NHV performance of a vehicle and increase salability and driving convenience of a driver.

As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:

1. An engine mounting structure for reducing vibration, comprising:
    an engine having a mass mounted to a damper pulley or a drive plate thereof to form an outer balancer;
    a transmission connected to the engine for transmitting output power of the engine;
    a roll mount positioned on a virtual yaw axis after the virtual yaw axis is set in the engine;
    an engine mount mounted to one end of a virtual torque roll axis after the virtual torque roll axis is set in the engine; and
    a transmission mount mounted to the other end of the virtual torque roll axis,
    wherein the virtual torque roll axis is a central axis of torque applied to the transmission based on a center of gravity of the engine and the transmission, and
    the virtual yaw axis is a vertical axis corresponding to a principal axis of inertia caused by a yaw moment of the engine.

2. The engine mounting structure for reducing vibration according to claim 1, wherein an entire excitation of the engine is generated along the virtual yaw axis through the mass.

3. The engine mounting structure for reducing vibration according to claim 1, wherein the roll mount is a roll rod type mount reducing horizontal rigidity.

4. The engine mounting structure for reducing vibration according to claim 1, wherein the engine mount and the transmission mount are damping mounts disposed in a front and rear direction and configured to reduce a spring value during an idle frequency.

5. The engine mounting structure for reducing vibration according to claim 4, wherein orifice plates in the front and rear direction are formed in the engine mount and the transmission mount to enable damping in the front and rear direction.

* * * * *